Dec. 29, 1925.

J. W. THOMANN

MUD WING

Filed March 12, 1925

1,567,770

Inventor
J. W. Thomann
By

Patented Dec. 29, 1925.

1,567,770

UNITED STATES PATENT OFFICE.

JACOB W. THOMANN, OF CARLYLE, SASKATCHEWAN, CANADA.

MUD WING.

Application filed March 12, 1925. Serial No. 15,133.

*To all whom it may concern:*

Be it known that I, JACOB W. THOMANN, of the town of Carlyle, in the Province of Saskatchewan, Canada, have invented certain new and useful Improvements in Mud Wings, of which the following is the specification.

The invention relates to improvements in mud wings and an object of the invention is to provide a device which can be quickly attached to a rear or driving automobile wheel and will effectively operate to give traction and permit of the automobile being run out of a mud hole, rut or other such difficult place.

A further object is to construct a device so that ample bearing surface is given on the tire and such that it affords additional traction surface, and also, such that it will prevent skidding of the automobile.

A further object is to construct a device such that any number can be used on a wheel depending on road conditions.

With the above more important objects in view the invention consists essentially in the arrangement and construction of parts hereinafter more particularly described, reference being had to the accompanying drawings in which.

In the drawing like characters of reference indicate corresponding parts in the several figures.

The wheel presents the customary felloe 1 carrying the usual outer casing 2 inflated by the inner tube 3, the casing being attached to the felloe by a rim 4.

In order to increase the traction of the driving wheel and also to prevent side skidding, I have provided my mud wings, a number of which can be used on a wheel, the number depending on the size of the wheel. The mud wings are all similarly constructed and are now described in detail.

Figures 2, 5:
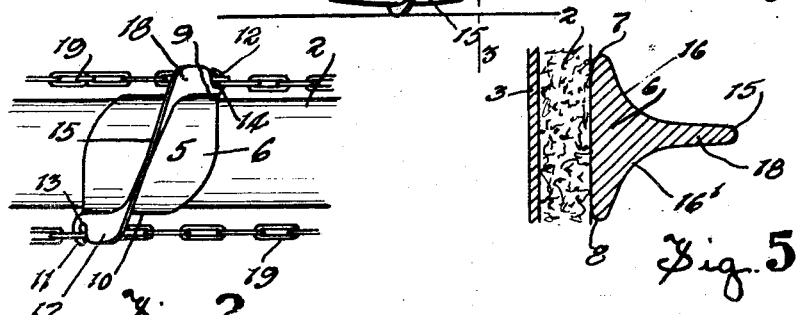
Fig. 2 is an inverted plan view of the mud wing and a portion of the tire.
Fig. 5 is an enlarged detailed horizontal sectional view at 5—5′ Figure 3.

Each wing 5 presents a more or less stirrup or U-shaped plate 6 which is bent to fit around the tread side of the tire, the tread part of the plate being comparatively wide and the ends of the plate being laterally offset in opposite directions so that the said plate spirals around the tire as best shown in Figure 2. The edges 7 and 8 of the plate are rounded away from the face of the tire so that there is no possibility of cutting the same. The ends 9 and 10 of the plate are tapered and terminate in out-turned hooks 11 and 12, the hooks presenting open eyes 13 and 14, positioned approximately horizontally opposite the inner face of the felloe.

Centrally and on the outer face of the plate I provide an outstanding flange 15 which also spirals and which is comparatively shallow at the tread side of the wheel and then widens out in passing up the upturned ends of the plate. In actual practice, I have found that the depth of this flange at the tread side will be approximately a quarter of an inch, whilst at the sides it will be one inch. This gives me increased traction at the tread without damaging the road surface and the angular direction of the web across the tread prevents side skidding.

The ends of the web merge into the hooks and form the lower sides of the eyes. The sides of the web merge in a curved manner as indicated 16 and 16′ into the plate, this amply reinforcing the web. The wide side portions of the web form side wings 17 and 18. A number of these mud wings can be used on a wheel and in such a case, the several mud wings are connected to the links of side chains 19, the hooks of the mud wings being caught in the links of the chain.

Figure 1:
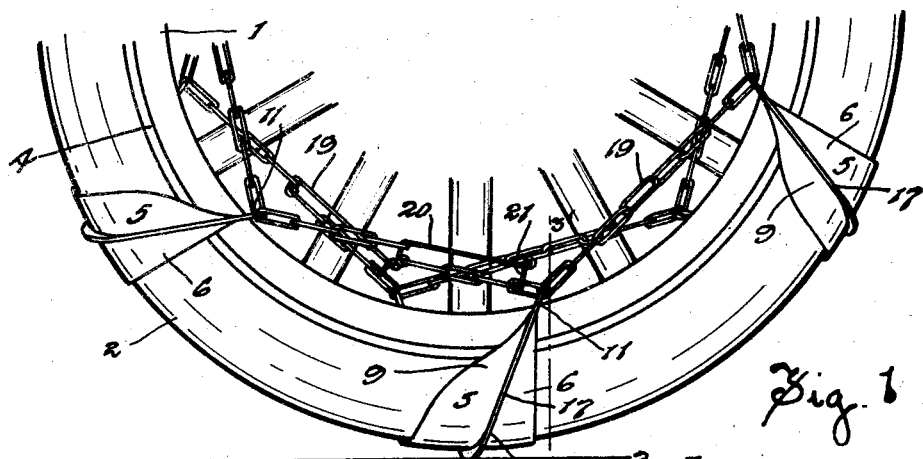
Fig. 1 is a side view of a portion of a wheel showing three of my mud wings in use.

The chains are provided with means for tightening on the wheel, such embodying in the present instance, a substantially L-shaped lever 20 having one end pivotally attached to one end of the chain and the other end passed through the end link at the other end of the chain and fastened to the chain by a loop 21. The length of the chains is gauged so that when the levers are swung and fastened in the position shown in Figure 1, the chains will be tight and will accordingly hold all the mud wings tightly pressed against the tire or outer casing of the wheel.

If these mud wings are placed on both rear or traction wheels, it is desirable to have the webs of the mud wings on the one wheel spiralling in an opposite direction to those on the other wheel as this would effectively prevent side skidding. An automobile having the rear wheels equipped with my device can be driven out of a mud hole or rut very easily as the webs give sufficient increased traction to move the automobile out of the rut. The comparatively wide side wings being at the side of the tire develop a thrust in the direction of travel of the tire and accordingly there is no digging action as occurs such as where chains alone are used.

Figures 3, 4:
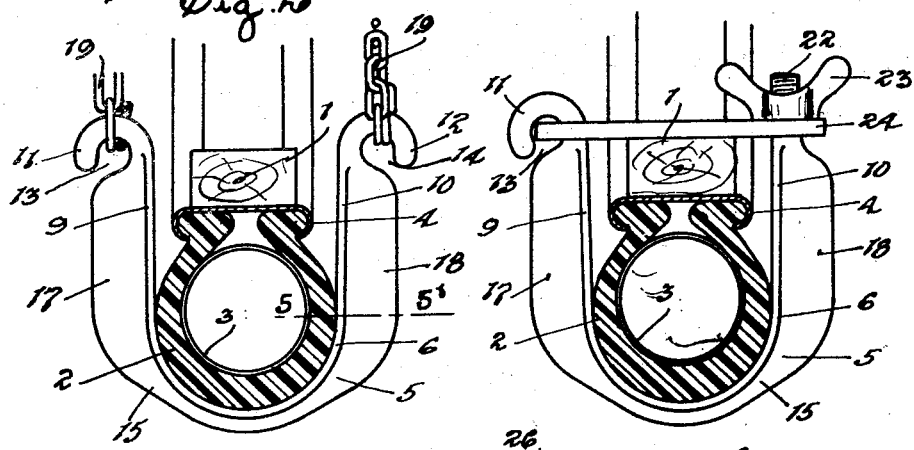
Fig. 3 is an enlarged detailed vertical sectional view at 3—3′ Figure 1.
Fig. 4 is a view similar to Figure 3 showing a modified means for attaching a wing to the wheel.
Figure 6:
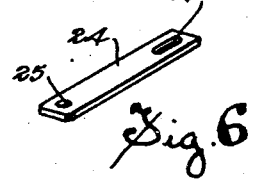
Fig. 6 is a perspective view of the plate.

In Figure 4 I have shown a modification of the mud wing which is particularly useful for emergency purposes. In this case one of the hooks of the device is removed and the end is extended upwardly and is screw threaded as indicated at 22 and is provided with a winged nut 23. A plate 24 is provided, the plate having an opening 25 therein to receive the hook 11 and being fitted further with an elongated opening 26 adapted to pass over the screw threaded end 22. When this mud wing has been put in place, the plate is caught on the hook and is afterwards fastened by the winged nut. As the nut is tightened down, the plate jambs over the felloe and firmly holds the device on the tire.

What I claim as my invention is:—

1. The combination with an automobile wheel, of a mud wing comprising a substantially U-shaped plate straddling the wheel tire and having the tread part thereof comparatively wide and the ends thereof tapered and terminating in hooks positioned adjacent the wheel felloe, the said plate being bent so that it spirals from end to end, means for holding the plate in working position on the tire and a web formed on the tread face of the plate and passing centrally thereof from end to end, the web being comparatively narrow at the tread side of the plate and comparatively wide elsewhere.

2. The combination with an automobile wheel, of a plurality of similar mud wings each comprising a substantially U-shaped spiralling plate straddling the tread side of the wheel tire, said plate having the tread part thereof comparatively wide and the ends thereof tapering and terminating in hooks positioned adjacent the felloe of the wheel, a centrally positioned web located on the tread side of the plate and passing from end to end thereof and being comparatively narrow at the tread side and comparatively wide elsewhere and similar tightening chains caught on the hooks and connecting the wings.

Signed at Carlyle this 6th day of February, 1925.

JACOB W. THOMANN.